(12) United States Patent
Nakajima et al.

(10) Patent No.: US 7,435,772 B2
(45) Date of Patent: Oct. 14, 2008

(54) METHOD AND APPARATUS FOR REMOVING ADDITIVES FROM THERMOPLASTIC RESIN COMPOSITION

(75) Inventors: Keizo Nakajima, Osaka (JP); Tetsuji Kawakami, Osaka (JP); Hiroshi Onishi, Osaka (JP); Takayoshi Ueno, Osaka (JP); Takahiko Terada, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/674,206

(22) Filed: Feb. 13, 2007

(65) Prior Publication Data

US 2007/0142523 A1   Jun. 21, 2007

Related U.S. Application Data

(62) Division of application No. 10/469,712, filed on Mar. 18, 2004, now Pat. No. 7,235,219.

(30) Foreign Application Priority Data

Mar. 1, 2001   (JP) .............................. 2001-056495

(51) Int. Cl.
*C08G 73/10*   (2006.01)
(52) U.S. Cl. ...................... 524/376; 524/377; 524/378; 524/395; 524/399
(58) Field of Classification Search ................. 524/378, 524/395, 399, 376, 377
See application file for complete search history.

(56) References Cited

U.S. PATENT DOCUMENTS 5,160,441 A   11/1992   Lundquist
5,443,772 A   8/1995   Inoue et al.
5,811,036 A   9/1998   Takahashi et al.

FOREIGN PATENT DOCUMENTS

| | | |
|---|---|---|
| EP | 0 818 474 A2 | 1/1998 |
| EP | 949293 A2 | 10/1999 |
| JP | 54-091551 | 7/1979 |
| JP | 56-055437 A | 5/1981 |
| JP | 06-157812 A | 6/1994 |
| JP | 08-299759 A | 11/1996 |
| JP | 09-262565 A | 10/1997 |
| JP | 10-195234 A | 7/1998 |
| JP | 2000-198874 A | 7/2000 |
| JP | 2000-198875 A | 7/2000 |
| JP | 2000-290424 A | 10/2000 |
| JP | 2001-072793 A | 3/2001 |
| JP | 2001-072795 A | 3/2001 |

OTHER PUBLICATIONS

Japanese International Search Report for PCT/JP02/01768, dated Jul. 2, 2002.
English translation of Japanese Search Report for Application No. PCT/JP02/01768 dated May 29, 2003.

*Primary Examiner*—Peter D Mulcahy
(74) *Attorney, Agent, or Firm*—RatnerPrestia

(57) ABSTRACT

There is provided a treatment method of efficiently separating an additive component from a resin component for the purpose of treating and recycling a thermoplastic resin composition containing an additive. The treatment method includes heating and agitating the thermoplastic resin composition containing the additive together with a solvent for dissolving at least part of the additive at a temperature ranging from the glass transition temperature of the thermoplastic resin to the boiling point of the solvent inclusive, and separating and recovering the solvent in a liquid state in which at least part of the additive is dissolved, so that at least part of the additive is separated and removed from the thermoplastic resin composition.

13 Claims, 6 Drawing Sheets

METHOD AND APPARATUS FOR REMOVING ADDITIVES FROM THERMOPLASTIC RESIN COMPOSITION

This application is a divisional of U.S. patent application Ser. No. 10/469,712, filed Mar. 18, 2004, which is a U.S. National Phase Application of PCT International Application PCT/JP2002/01768, filed Feb. 27, 2002, the entire disclosure of which is incorporated herein by reference.

TECHNICAL FIELD

The present invention relates to a treatment method and a treatment apparatus of separating and removing additive components from a thermoplastic resin composition containing various additives. For example, the present invention is useful for separating and removing additive components from housings made of resins containing the additive components for home electric appliances to be recovered according to the Electric Appliance Recycling Law. In particular, it is effective for separating and removing flame retardants and flame retardant auxiliaries from the thermoplastic resin composition containing the flame retardants, flame retardant auxiliaries and the like to be used as housings for TVs and PC monitors.

BACKGROUND ART

At present, thermoplastic resins such as propylene resins, styrene resins, acrylonitrile/butadiene/styrene (ABS) resins, and high-impact polystyrene resins having improved impact resistance are generally used for housings of TVs and PC monitors and those for various home electric appliances. These are used with additive components incorporated for the purpose of imparting various functions to the resins. For example, as thermoplastic resins have high combustibility by themselves, the resins are mixed with flame retardants and flame retardant auxiliaries in a proportion of about 10 to 25% by weight from the viewpoint of preventing the spread of fire during the fire. In particular, bromine-based flame retardants have a high flame retarding effect on various resins and have a low price, so that they have been globally used.

The bromine-based flame retardants have excellent flame retardancy to aromatic resins represented by styrenic resins and have been used in large quantities for various housings and component materials in home electric appliances. Hence, resin compositions containing the bromine-based flame retardants are discarded in large quantities when these home electric appliances are scrapped.

Generally, in the methods of treating resin wastes, incineration and landfill have been mainly employed and only a part of them is recycled through heating/melting or the like. It is desired to dispose of waste plastics by incineration considering shortages of landfill site. However, the resin compositions containing flame retardancy find difficulty in incineration due to the high degree of flame retardancy imparted thereto, finding difficulty in disposing.

In addition, as awareness to environmental issues is raised, the harmful effect of halogenated organic substances on environment is pointed out and the use of the halogenated organic substances is being restricted. At present, each of the users is under review of switching the halogenated flame retardants to the flame retardants containing no halogenated organic substances such as phosphorus-based compounds. However, the phosphorus-based compounds have less capability of imparting flame retardancy compared to the halogenated organic substances, so that the present situation is that the switching from the halogenated organic substances almost stops.

Further, in recent years, the reuse of the resources derived from petroleum chemistry is strongly requested and the establishment of the methods of resin waste disposal and recycling has become an important issue. Particularly, the Electric Appliance Recycling Law that has come into effect since April 2001 requests suitable recycling treatment on TV sets, refrigerators, air conditioners, and washing machines.

For the time being the target of the recycling rate is about 50 to 60%, which may be met by the efforts for promoting the recycling of glass and metal that occupy relatively large proportion by weight in each of the products. However, as the target is anticipated to become higher in future, the establishment of the resin recycling method is desired.

Various studies have been carried out on a method of treating a resin composition containing a flame retardant. However, these studies mainly include acid treatment (Japanese Patent Laid-Open No. 6-157812) or high temperature treatment (Japanese Patent Laid-Open No. 8-299759, Japanese Patent Laid-Open No. 9-262565, and Japanese Patent Laid-Open No. 2000-198874). They mainly include the thermal cycle treatment in which a resin and a flame retardant are completely decomposed. Almost no efforts with the objective of material recycling of resins are found. Japanese Patent Laid-Open No. 10-195234 proposes a method of separating a flame retardant from a resin by modifying the resin. This method considers the use of the resin to other applications by functionalizing it. However, we think that the establishment of a recycling method mainly of recycling the resin to general-purpose applications is urgent.

DISCLOSURE OF INVENTION

The present invention has been proposed in view of these situations, and it is an object of the present invention to provide a treatment method and a treatment apparatus in which material recycling is easily possible on housings made of thermoplastic resins containing additives such as a flame retardant.

The inventors have found a method of separating and removing an additive component such as a flame retardant from a resin by bringing a thermoplastic resin composition containing an additive such as a flame retardant into contact under heating with a specific solvent to positively dissolve only the additive component such as the flame retardant from the resin, and have completed the present invention, after having diligently investigated the above described problems.

A first aspect of the present invention is a method of treating a thermoplastic resin composition containing an additive, characterized by comprising: heating and agitating the thermoplastic resin composition containing the additive together with a solvent wherein a solubility parameter ($SP_{solvent}$) is not smaller than a solubility parameter of said thermoplastic resin component+1($SP_{resin}$+1)((MPa)$^{0.5}$ as the unit), comprising at least one selected from glycol-based solvents, glycol ether-based solvents, lactate-based solvents, or alcohol-based solvents having five or more carbon atoms at a temperature ranging from a glass transition temperature of said thermoplastic resin to a boiling point of said solvent inclusive; and separating and recovering said solvent in a liquid state in which at least part of said additive is dissolved, so that at least part of said additive is separated and removed from said thermoplastic resin composition.

A second aspect of the present invention is the method of treating a thermoplastic resin composition containing an additive according to the first aspect of the present invention, characterized in that said thermoplastic resin composition is a styrenic resin.

A third aspect of the present invention is the method of treating a thermoplastic resin composition containing an additive according to the first aspect of the present invention, characterized in that said styrenic resin comprises any one of poly-styrene, poly-α-methyl styrene, poly-styrene-butadiene, poly-styrene-acrylonitrile, poly-styrene-butadiene-acrylonitrile, poly-styrene-maleic anhydride, and impact-resistant high-impact polystyrene.

A fourth aspect of the present invention is the method of treating a thermoplastic resin composition containing an additive according to the first aspect of the present invention, wherein said additive consists of two or more additive components and at least part of each of said two or more additive components is separated and removed from said thermoplastic resin composition with the solvent for dissolving at least part of each of the additive components.

A fifth aspect of the present invention is the method of treating a thermoplastic resin composition containing an additive according to the first aspect of the present invention, wherein the additive contained in said thermoplastic resin composition comprises a bromine-based flame retardant and an antimony-based flame retardant auxiliary, and the solvent wherein a solubility parameter ($SP_{solvent}$) is not smaller than a solubility parameter of said thermoplastic resin component+1($SP^{resin}$+1)(($MPa)^{0.5}$ as the unit), consisting of at least one selected from glycol-based solvents, glycol ether-based solvents, lactate-based solvents, or alcohol-based solvents having five or more carbon atoms is used as the solvent for dissolving at least part of the bromine-based flame retardant and the solvent selected from ethylene glycol or propylene glycol is used as the solvent for dissolving at least part of the antimony-based flame retardant auxiliary, so that at least part of each of the bromine-based flame retardant and the antimony-based flame retardant auxiliary is separated and removed from said thermoplastic resin composition.

A sixth aspect of the present invention is the method of treating a thermoplastic resin composition containing an additive according to the first aspect of the present invention, wherein the additive contained in said thermoplastic resin composition comprises a bromine-based flame retardant and an antimony-based flame retardant auxiliary, and the solvent wherein a solubility parameter ($SP_{solvent}$) is not smaller than a solubility parameter of said thermoplastic resin component+1($SP^{resin}$+1)(($MPa)^{0.5}$ as the unit), consisting of at least one selected from glycol-based solvents, glycol ether-based solvents, lactate-based solvents, or alcohol-based solvents having five or more carbon atoms is used as the solvent for dissolving at least part of the bromine-based flame retardant to separate and remove at least part of the bromine-based flame retardant from said thermoplastic resin component, and then the solvent selected from ethylene glycol or propylene glycol is used as the solvent for dissolving at least part of the antimony-based flame retardant auxiliary to separate and remove at least part of the antimony-based flame retardant from said thermoplastic resin component.

A seventh aspect of the present invention is an apparatus of treating a thermoplastic resin composition containing an additive, comprising: means of charging a solvent wherein a solubility parameter ($SP_{solvent}$) is not smaller than a solubility parameter of said thermoplastic resin component+1($SP_{resin}$+1) (($MPa)^{0.5}$ as the unit), for dissolving at least part of the additive comprising at least one selected from glycol-based solvents, glycol ether-based solvents, lactate-based solvents, or alcohol-based solvents having five or more carbon atoms and the thermoplastic resin composition containing said additive; means of heating to a temperature ranging from the glass transition temperature of said thermoplastic resin to the boiling point of said solvent inclusive; means of agitating said thermoplastic resin composition containing the additive and/or said solvent; and means of separating the solvent in a liquid state in which at least part of said additive is dissolved to the outside of the treatment apparatus.

An eighth aspect of the present invention is an apparatus of treating a thermoplastic resin composition containing an additive, comprising: a cylinder holding a heating mechanism; a single or a plurality of screws connected with a center axis in the cylinder; a drive mechanism at the base end of the screw axis to rotate the screw; an inlet for a thermoplastic resin composition containing said additive and an inlet for a solvent for dissolving at least part of said additive in the neighborhood of the base end of the screw axis, wherein the screw axis is arranged such that the rotation thereof transfers the thermoplastic resin composition containing said additive and said solvent from the base end side toward the leading end side while pressuring, heating and kneading them; an outlet for discharging said solvent in a liquid state in which at least part of said additive is dissolved, at the location closer to the leading end side than said inlet; and an resin extrusion section for extruding said kneaded and molten thermoplastic resin composition from which at least part of said additive is separated and removed, at the leading end.

A ninth aspect of the present invention is an apparatus of treating a thermoplastic resin composition containing an additive according to the eighth aspect of the present invention, comprising at least 2 pairs of the inlet for the solvent for dissolving at least part of said additive and the outlet for discharging the solvent in a liquid state in which at least part of said additive is dissolved, disposed repeatedly in this order from the base end toward the leading end.

A tenth aspect of the present invention is an apparatus of treating a thermoplastic resin composition containing an additive according to the eighth or the ninth aspect of the present invention, wherein the outlet for discharging the solvent in a liquid state in which at least part of said additive is dissolved is disposed at a lower side than said screw axis.

An eleventh aspect of the present invention is an apparatus of treating a thermoplastic resin composition containing an additive according to any of the eighth to the tenth aspects of the present invention, wherein a deaeration port for deaerating part of said solvent from said resin composition is provided between the outlet for discharging the solvent in a liquid state in which at least part of said additive and the resin outlet.

Figure 1:
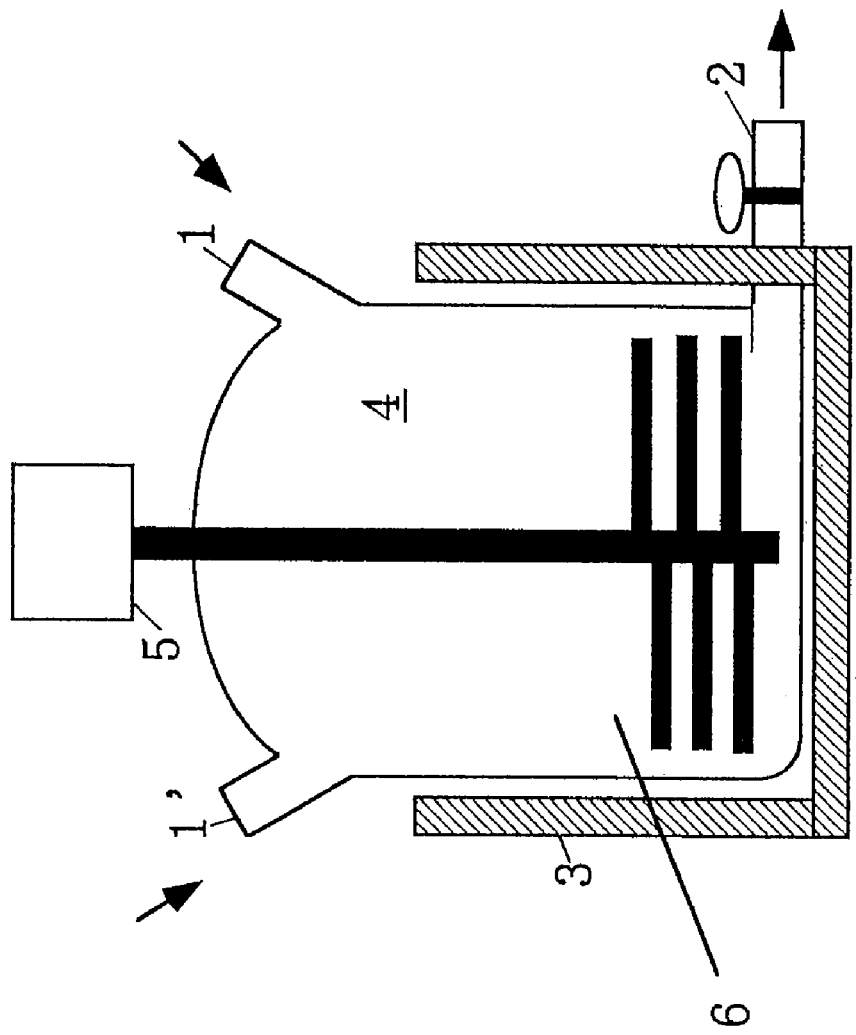
FIG. 1 is a schematic view of an apparatus illustrating the present invention.

DESCRIPTION OF SYMBOLS 1, 1': solvent and resin inlet
2: solvent outlet
3: heater 4: reaction vessel
5: agitator
6: resin
7: solvent
11: kneader
12: resin inlet (hopper)
13: screw
14: heater
15: cylinder
16: motor
17: solvent inlet
18: solvent outlet
19: resin outlet (die)
20: vent
21: vacuum pump
22: solvent trap
23: cooling water bath
24: cutter
25: resin pellet
27: solvent inlet
28: solvent outlet

BEST MODE FOR CARRYING OUT THE INVENTION

The present invention relates to a treatment method and a treatment apparatus of bringing a thermoplastic resin composition containing an additive into contact under heating with a specific solvent and subjecting them to kneading under heating to obtain a resin from which at least part of the additive is removed by a simple method.

The thermoplastic resin composition as herein described refers to a reject and a fragment formed in a molding process in a manufacturing field and the like, or a housing resin recovered at recycling locations as waste home electric appliances. In addition, the additives include materials that are preferably removed for reuse and recycle such as a flame retardant and a flame retardant auxiliary, as well as a stabilizer, a colorant, a plasticizer, a flowability modifier, a release agent, and an antioxidant. The resin composition may have a surface on which an acrylic coating is applied.

The flame retardants that are known include phenyl ether-based flame retardants such as decabromodiphenyl ether, octabromodiphenyl ether, tetrabromodiphenyl ether; bisphenol A-type flame retardants such as tetrabromobisphenol A (TBA); bromine-based flame retardants such as hexabromocyclododecane, bis(tribromophenoxy)ethane, tribromophenol, ethylene bis-tetrabromophthalimide, a TBA polycarbonate oligomer, a brominated polystyrene, a TBA epoxy oligomer; chlorine-based flame retardants such as a chlorinated paraffin, perchloro cyclopentadecane, chlorendic acid; phosphorus-based flame retardants; flame retardants containing nitrogen compounds; and inorganic flame retardants.

The flame retardants may be contained singly or in combination in the thermoplastic resin composition. The flame retardants may be a mixture consisting of a flame retardant comprising a halogenated organic compound such as a bromine-based flame retardant and an inorganic flame retardant auxiliary typified by antimony trioxide or the like, depending on the grade of flame retardancy. The content of the flame retardants is not limited, but they are typically mixed in approximately 10 to 20% by weight relative to the weight of the resin composition.

On the other hand, the present invention can be applied to any thermoplastic resins such as ethylene resins, propylene resins and styrenic resins, and is particularly effective for styrenic resins. The styrenic resins include resins comprising polystyrene, poly-α-methyl styrene, styrene-butadiene, styrene-acrylonitrile, styrene-butadiene-acrylonitrile, styrene-maleic anhydride, and impact-resistant high-impact polystyrene.

The above described styrenic resins may be used singly or in combination. They may be a mixture with other resins. The molecular weight of the styrenic resins is not limited, but is preferably from approximately 3,000 to 3,000,000 as a weight average molecular weight.

It is generally said that while a group of compounds called a "non-deca" type exhibits generally good solubility to general purpose solvents, decabromodiphenyl ether (popularly called "decabro") is insoluble in a solvent, among bromine-based flame retardants. However, it has been found through the study of the present invention that any flame retardant completely dissolves in a solvent if the concentration in the solvent is approximately 5%. According to the present invention, the additives can be separated and removed from the resin component regardless of the type and the content of the additives in the resin by optimizing the heating and kneading conditions. This is also one of the important features of the present invention.

Moreover, the means of heating and agitation herein referred may be an apparatus in which continuous kneading is possible such as an extruder, an injection machine, or a blow molding machine having a single screw or twin screws, or may be an apparatus having the agitation function of a batch treatment type.

In addition, the solvent used for dissolving the additives according to the present invention can be used repeatedly by a distillation operation or a filtering operation of the additives utilizing the temperature dependence of the solubility of the additives, so that the amount of its usage can be suppressed. Further, the additives recovered as a residue after removing the solvent can be recovered without being diffused in air. Moreover, the volume of the recovered additives is very small compared with the weight of the total weight of the resin composition, so that it can be handled under special control.

Thus, according to the present invention, the treatment can be performed in the form in which the environment is given consideration such as appropriate treatment, recovery and recycling treatment of substances having potential of environmental pollution, as well as a reduction of the amount of solvent used.

The treatment method of the present invention will now be described in detail.

The method of treating a thermoplastic resin composition containing an additive according to the present invention comprises heating and agitating the thermoplastic resin composition containing the additive together with a solvent for dissolving at least part of the additive at a temperature ranging from the glass transition temperature of the thermoplastic resin to the boiling point of the solvent inclusive, and separating and recovering the solvent in a liquid state in which at least part of the additive is dissolved, so that at least part of the additive is separated and removed from the thermoplastic resin composition.

Although it is possible to dissolve at least part of the additive from the neighborhood of the resin surface area even in a temperature condition of the glass transition temperature or below of the thermoplastic resin composition, the rate of the removal may be small and the condition may be insufficient in terms of efficiency. The kneading and agitation treatment at the glass transition temperature or above where heat distortion occurs allows removal of the additive component present inside the resin, which is more desirable. Moreover, heating to a temperature of the boiling point or above of the solvent for dissolving at least part of the additive may cause thermal degradation of the resin and may prevent the dissolution behavior of the additive itself, resulting in reduction of the efficiency of the removal. Therefore, the treatment in the temperature condition described above is desirable.

Moreover, there is a method of removing the solvent by a vacuum vent of a kneader as a method of separating the solvent used for the reaction from a resin. However, this method recovers the solvent used for the reaction as steam, which is different from the form described in the present invention in which the solvent is recovered in a liquid state. In the case of the steam recovery, the additive cannot be separated and recovered since only the solvent is finally recovered. Separation of the solvent in a liquid state in which at least part of the additive is dissolved is an important point of the present invention.

The solubility parameter of the solvent for dissolving at least part of the additive contained in the thermoplastic resin composition according to the present invention is characterized by not smaller than the solubility parameter value of the thermoplastic resin component+1$((MPa)^{0.5}$ as the unit).

It is possible to dissolve the resin by using the solvent exhibiting a solubility parameter that is almost the same as that of the resin. However, by using the solvent having a solubility parameter exhibiting the condition described in the present invention, the solubility of the resin itself can be suppressed and at the same time the solubility of the additive component can be improved, so that it becomes possible to carry out the most suitable treatment.

Specifically, the solvent preferably includes one selected from the group consisting of glycol-based solvents, glycol ether-based solvents, lactic acid e lactate-based solvents, or alcohol-based solvents having five or more carbon atoms and mixtures thereof. These solvents typically have relatively high boiling point, and exist in a liquid state even during heating and agitation, and heating and kneading treatment. In addition, they often have a high flash point, which is considered to be preferable as the work environment will be safer.

The group of the above described compounds includes ethylene glycol, diethylene glycol, propylene glycol, dipropylene glycol, diethylene glycol methyl ether, diethylene glycol ethyl ether, diethylene glycol propyl ether, diethylene glycol butyl ether, propylene glycol methyl ether, propylene glycol ethyl ether, propylene glycol propyl ether, dipropylene glycol methyl ether, dipropylene glycol ethyl ether, dipropylene glycol propyl ether, dipropylene glycol butyl ether, triethylene glycol methyl ether, triethylene glycol ethyl ether, triethylene glycol propyl ether, triethylene glycol butyl ether, tripropylene glycol methyl ether, tripropylene glycol ethyl ether, tripropylene glycol propyl ether, tripropylene glycol butyl ether, ethyl lactate, butyl lactate, 1-pentanol, 2-methyl-1-buthanol, iso-pentyl alcohol, 1-hexanol, 2-methyl-1-pentanol, 4-methyl-2-pentanol, 1-hepthanol, 2-ethyl-1-hexanol, 3,5,5-trimethyl-1-hexanol, and 1-decanol.

As for the solvent to be used in the present invention, the higher concentration of the above described compounds can enhance the insolubility to styrenic polymers and enhance the solubility to the additives. Therefore, the concentration of the above described compounds is desirably as high as possible. Moreover, the concentration is desirably such that the solvent is included as a main component and is preferably at least 50% by weight or more of the weight of the total solvent.

Moreover, the additive contained in the thermoplastic resin composition of the present invention may include an additive consisting of two or more additive components. In this case, the removal and separation may be performed with the same solvent and process to the greatest extent practicable, but it is also possible to use the solvents that can dissolve respective additives, although associated with the efficiency of the removal and the complexity of the process. Further, the method of removing different types of additives may include separation and removal of specific additive components by mixing two or more different solvents. Alternatively, it is possible to take steps by repeating the above described treatment method the time of the number of additive types; that is, after an additive 1 is removed and separated, an additive 2 is separated and removed and further an additive 3 is separated and removed. Therefore, a plurality of apparatuses may be provided in such a way as removing the additive 1 in an apparatus 1 and the additive 2 in an apparatus 2.

Moreover, the present invention proposes a method that can also treat the case where the additives contained in the thermoplastic resin composition include a bromine-based flame retardant and an antimony-based flame retardant auxiliary. The solvent that dissolves at least part of the bromine-based flame retardant is selected from the group consisting of glycol-based solvents, glycol ether-based solvents, lactate-based solvents, or alcohol-based solvents having five or more carbon atoms or mixtures thereof. Also, the solvent that dissolves at least part of the antimony-based flame retardant auxiliary includes a solvent selected from the group consisting of ethylene glycol or propylene glycol. It has been found this time that the use of the respective solvents allows separation and removal of at least part of each of the bromine-based flame retardant and the antimony-based flame retardant auxiliary from the thermoplastic resin composition.

Further, it has been found this time that when the bromine-based flame retardant and the antimony-based flame retardant auxiliary are contained in the thermoplastic resin composition, the efficiency of removal changes depending on the order of the removal. Specifically, it is possible to remove the bromine-based flame retardant and the antimony-based flame retardant auxiliary efficiently from the thermoplastic resin composition by separating and removing at least part of the bromine-based flame retardant from the thermoplastic resin composition using the solvent selected from the group consisting of glycol-based solvents, glycol ether-based solvents, lactate-based solvents, or alcohol-based solvents having five or more carbon atoms or mixtures thereof as the solvent for dissolving at least part of the bromine-based flame retardant, and then by separating and removing at least part of the antimony-based flame retardant auxiliary from the thermoplastic resin composition using the solvent selected from ethylene glycol or propylene glycol as the solvent for dissolving at least part of the antimony-based flame retardant auxiliary.

The apparatus for treating the thermoplastic resin composition containing the additive according to the present invention has means of charging the solvent for dissolving at least part of the additive and the thermoplastic resin composition containing the additive, means of heating to a temperature ranging from the glass transition temperature of the thermoplastic resin to the boiling point of the solvent inclusive, means of agitating the thermoplastic resin composition containing the additive and/or the solvent, and means of separating the solvent in which at least part of the additive is dissolved to the outside of the treatment apparatus in a liquid state.

As shown in FIG. 1, a specific apparatus is a reaction vessel 4 with an agitation function 5, having solvent and resin inlets 1, 1', an outlet 2 for separating the solvent in which at least part of an additive is dissolved and a heater 3.

The means of charging the solvent and the thermoplastic resin composition may include an inlet that shares the charge of the both materials, or may include different inlets for respective materials. Alternatively, the solvent and the resin composition are preliminarily mixed and kneaded before the means of charging. Moreover, although the outlet for separating the solvent in which at least part of the additive is dissolved needs to be provided, the remained resin composition can be taken out in various ways. It may be taken out from the resin inlet without providing a specific outlet, or a specific outlet for the resin may be provided. It is desirable to obtain a desired resin composition by single treatment for heating and agitation and separation of a solvent, but two or more treatments may be performed in terms of removal rate or operability without any problem.

In addition, an apparatus of treating the thermoplastic resin composition containing the additive according to the present invention incorporates a single or a plurality of screws connected with a center axis in a cylinder holding a heating mechanism. A drive mechanism is provided at the base end of the screw axis to rotate it, and an inlet for the thermoplastic resin composition containing the additive and an inlet for the solvent for dissolving at least part of the additive are provided in the neighborhood of the base end of the screw axis. The screw axis is arranged such that the rotation thereof transfers the thermoplastic resin composition containing the additive and the solvent from the base end side toward the leading end side while pressuring, heating and kneading them. At the location closer to the leading end side than the inlet, there is provided an outlet for discharging the solvent in a liquid state in which at least part of the additive is dissolved. At the leading end, there is provided an extrusion section for extruding the kneaded and molten thermoplastic resin composition from which at least part of the additive is separated and removed.

Figure 2:
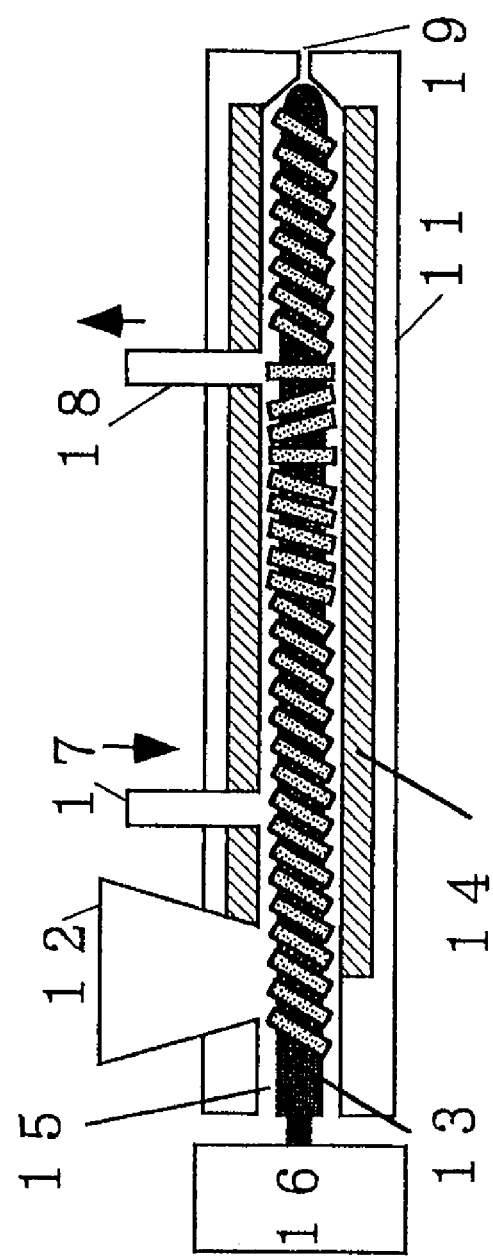
FIG. 2 is a schematic view of an apparatus illustrating the present invention.

As shown in FIG. 2, a specific apparatus capable of practicing the present invention comprises a typical extruder 11 with a solvent inlet 17 and a solvent outlet 18, that is provided with a hopper 12 that is a resin inlet, a screw 13 to transfer the charged resin toward a leading end side while kneading, the screw 13 being held in a cylinder 15 having a heater 14, a motor 16 to rotate the screw axis placed at the base end of the screw 13, and a resin outlet 19.

The extruder 11 includes a single extruder and a twin extruder, but in this case the twin extruder having high kneading effect is particularly suitable. At this time, a filter-type separator can be provided in the vicinity of the solvent outlet to separate a low viscosity solvent from a resin composition. Alternatively, the separation can also be enhanced by adjusting the pitch and shape of the screw. Any procedure may be used to separate a solvent from a resin. In addition, a vent may be provided as a deaeration port for the purpose of removing a high boiling point solvent used for kneading at a location between the solvent outlet and the resin outlet. Further, the vent can also be recovered as a steam component using the means such as a vacuum pump.

A further preferred apparatus of treating a thermoplastic resin composition containing an additive according to the present invention is the one having an inlet for the solvent for dissolving at least part of the additive and an outlet for discharging the solvent in a liquid state in which at least part of the additive is dissolved, in which the inlet and the outlet constitutes a pair in this order from the base end toward the leading end, and at least two or more of the pairs are disposed repeatedly. Although one inlet 17 and one outlet 18 are provided in FIG. 2, the inlet and the outlet may be provided in plural numbers in terms of the removing rate of the additive to be removed. The important point is that the inlet and the outlet are preferably disposed repeatedly in this order from the base end side toward the leading end side.

In addition, in the apparatus of treating the thermoplastic resin composition containing the additive according to the present invention, the outlet for discharging the solvent in a liquid state in which at least part of the additive is dissolved is preferably disposed at a lower side than the screw axis. Such a form can reduce the migration of the solvent to the leading end side compared with discharging the solvent in a liquid form from an upper side. Therefore, it is possible to reduce the residual solvent in the resin and decrease the vent treatment or the like that follows.

As described above, it is possible to combine the apparatuses illustrated in FIGS. 1 and 2 in plural numbers, providing the treatment apparatus that can exert excellent capability. For example, in the case where a plurality of additives is included, an additive component 1 is removed by a batch treatment by agitation, and then an additive component 2 may be removed by a continuous treatment by kneading. Moreover, even in the case of only one additive, the use of different solvents allows maximization of the removing rate.

The present invention will now be described in detail with reference to examples.

EXAMPLE 1

In the present example, a thermoplastic resin composition consisting of a bromine-based flame retardant having a tetrabromobisphenol A-based structure as an additive component and polystyrene (a weight average molecular weight of the resin of 105,000 and a solubility parameter of the polystyrene of 18.6) as a resin component was prepared, and the flame retardant component contained in the resin composition was to be separated. At this time, the amount of the flame retardant was adjusted such that it was contained in 15 parts by weight relative to the resin composition.

Figure 3:
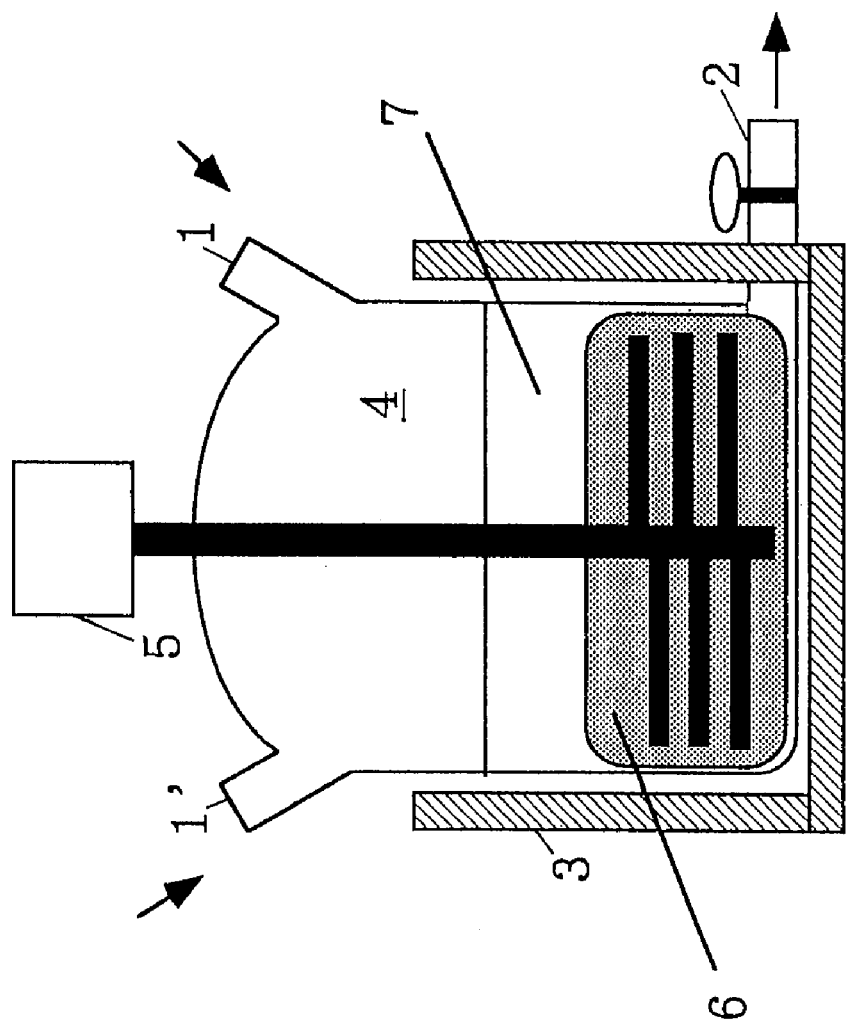
FIG. 3 is a schematic view of an apparatus illustrating Example 1 of the present invention.

A schematic view of an apparatus for use in the present example is shown in FIG. 3. This apparatus is a reaction vessel 4 with an agitation function 5, having solvent and resin inlets 1, 1', an outlet 2 for separating the solvent in which at least part of the flame retardant is dissolved and a heater 3.

The resin composition was first roughly ground to blocks of about 5 mm square and fed to the apparatus of FIG. 3 together with dipropylene glycol 7 (a solubility parameter of 20.5), followed by agitation at about 180° C. for two hours. The liquid in which the flame retardant was dissolved was then recovered from the outlet. After the apparatus was sufficiently stood to cool, the resin component 6 was recovered from the inlet.

The remained amount of the flame retardant in the obtained resin was determined by GPC, and it was found that the flame retardant was removed down to 5% relative to 100% of the initial weight. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 8%. It was found that 98% of the initial weight of the original solvent could be recycled by solidifying and separating the flame retardant component by distillation.

EXAMPLE 2

In the present example, a thermoplastic resin composition consisting of a bromine-based flame retardant of decabromodiphenyl ether as an additive component and polystyrene (a weight average molecular weight of the resin of 100,000 and a solubility parameter of the polystyrene of 18.6) as a resin component was prepared, and the flame retardant component contained in the resin composition was to be separated. At this time, the amount of the flame retardant was adjusted such that it was contained in 12 parts by weight relative to the resin composition.

Figure 4:
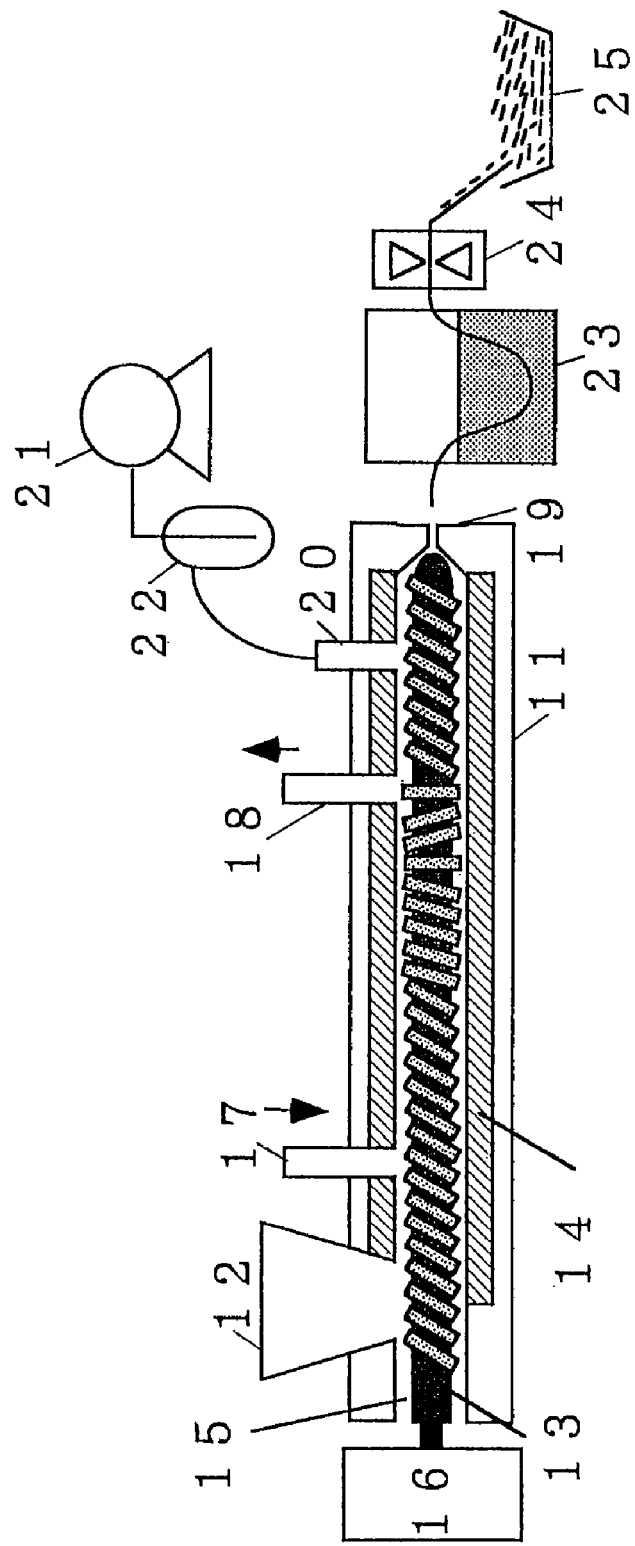
FIG. 4 is a schematic view of an apparatus illustrating Example 2 of the present invention.

A schematic view of an apparatus for use in the present example is shown in FIG. 4. This apparatus comprises a twin-screw extruder 11 with a solvent inlet 17 and a solvent outlet 18, that is provided with a hopper 12 that is an inlet of a resin, a screw 13 to transfer the charged resin toward a leading end side while kneading, the screw 13 being held in a cylinder 15 having a heater 14, a motor 16 to rotate the screw axis placed at the base end of the screw 13, a resin outlet 19.

The heater 14 for the cylinder 15 was first set at 180° C. The resin composition that was roughly ground to 5 mm square was supplied from the hopper 12 and dipropylene glycol (a solubility parameter of 20.5) was added from the solvent inlet 17, and they were subjected to heating and kneading treatment. At this time, the segment of the screw 13 was adjusted such that the solvent in which the flame retardant component was dissolved was discharged from the outlet 18.

The solvent was charged in an amount of 5.0 relative to the amount of charged resin of 1.0, and the amount of recovered solvent was 4.9 after calculating the increase for the separated flame retardant and the decrease for the solvent that remained in the resin. After that, a vacuum pump 21 was provided to a vent 20 through a solvent trap 22; the resin was discharged from a resin outlet 19; and resin pellets 25 were obtained through a cooling bath 23 and a cutter 24.

The remained amount of the flame retardant in the obtained resin was determined by GPC, and it was found that the flame retardant was removed down to 5% relative to 100% of the initial weight. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 2%. It was found that 98% of the initial weight of the original solvent could be recycled by solidifying and separating the flame retardant component by distillation.

EXAMPLE 3

Figure 5:
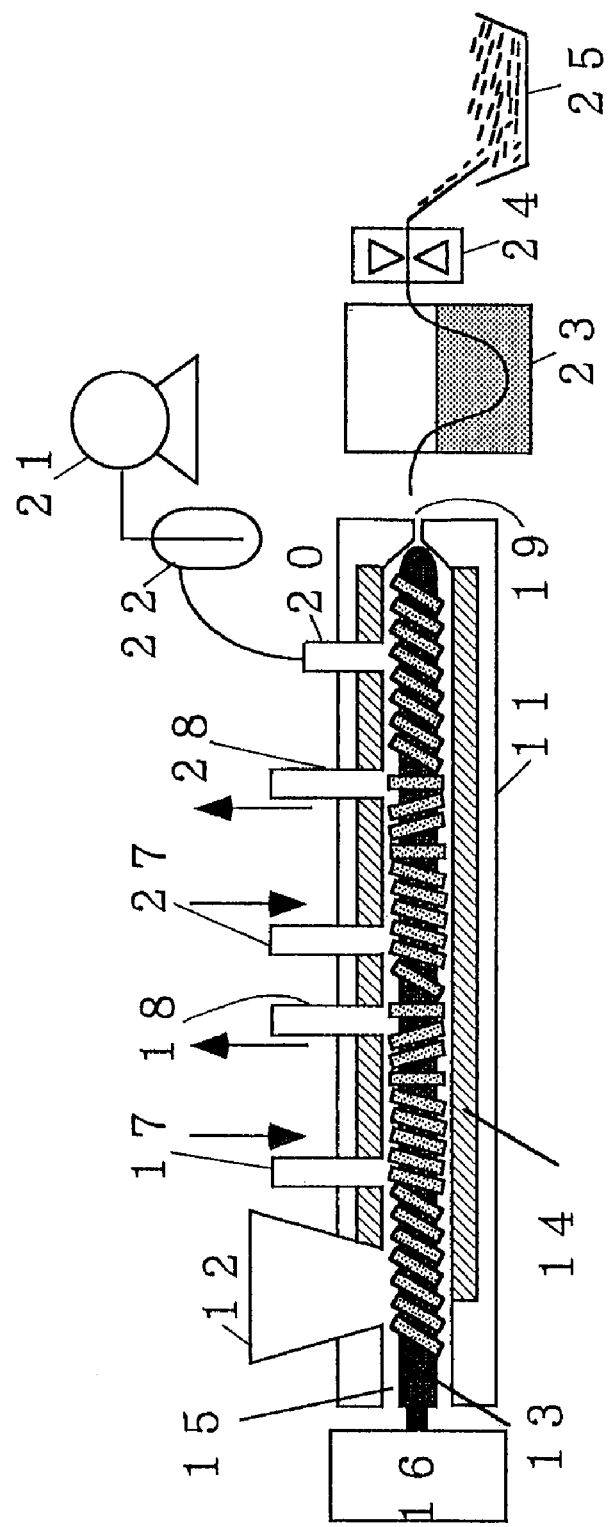
FIG. 5 is a schematic view of an apparatus illustrating Example 3 of the present invention.

In the present example, the same thermoplastic resin composition as used in Example 2 was prepared and the removal treatment of a flame retardant was performed using the apparatus as shown in FIG. 5. The difference between FIGS. 4 and 5 is that in addition to a solvent inlet 17 and a solvent outlet 18, another pair of solvent inlet 27 and solvent outlet 28 was provided at locations closer to the leading end.

The heater 14 for the cylinder 15 was first set at 170° C. The resin composition that was roughly ground to 5 mm square was supplied from the hopper 12 and propylene glycol (a solubility parameter of 25.8) was added from the first solvent inlet 17, and they were subjected to heating and kneading treatment. At this time, the segment of the screw 13 was adjusted such that the solvent in which the flame retardant component was dissolved was discharged from the first outlet 18. The same operation was performed for the second solvent inlet 27 and the second solvent outlet 28. At this time, both of the first and the second solvent were charged in an amount of 5.0 relative to the amount of charged resin of 1.0. The amounts of recovered solvent were 4.9 and 4.8 for the first and the second, respectively. After that, a vacuum pump 21 was provided to a vent 20 through a solvent trap 22; the resin was discharged from a resin outlet 19; and resin pellets 25 were obtained through a cooling bath 23 and a cutter 24.

The remained amount of the flame retardant in the obtained resin was determined by GPC, and it was found that the flame retardant was removed down to 1.8% relative to 100% of the initial weight. The amount of the charged solvent was increased compared with Example 2, and it was found that the flame retardant contained in the thermoplastic resin was removed in more quantities. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 3%. When the treatment with the vacuum pump at the vent was not performed, it was about 8%. Thus, the effect of adding the vent was confirmed. It was found that 98% of the initial weight of the original solvent could be recycled by solidifying and separating the flame retardant component by distillation.

EXAMPLE 4

Figure 6:
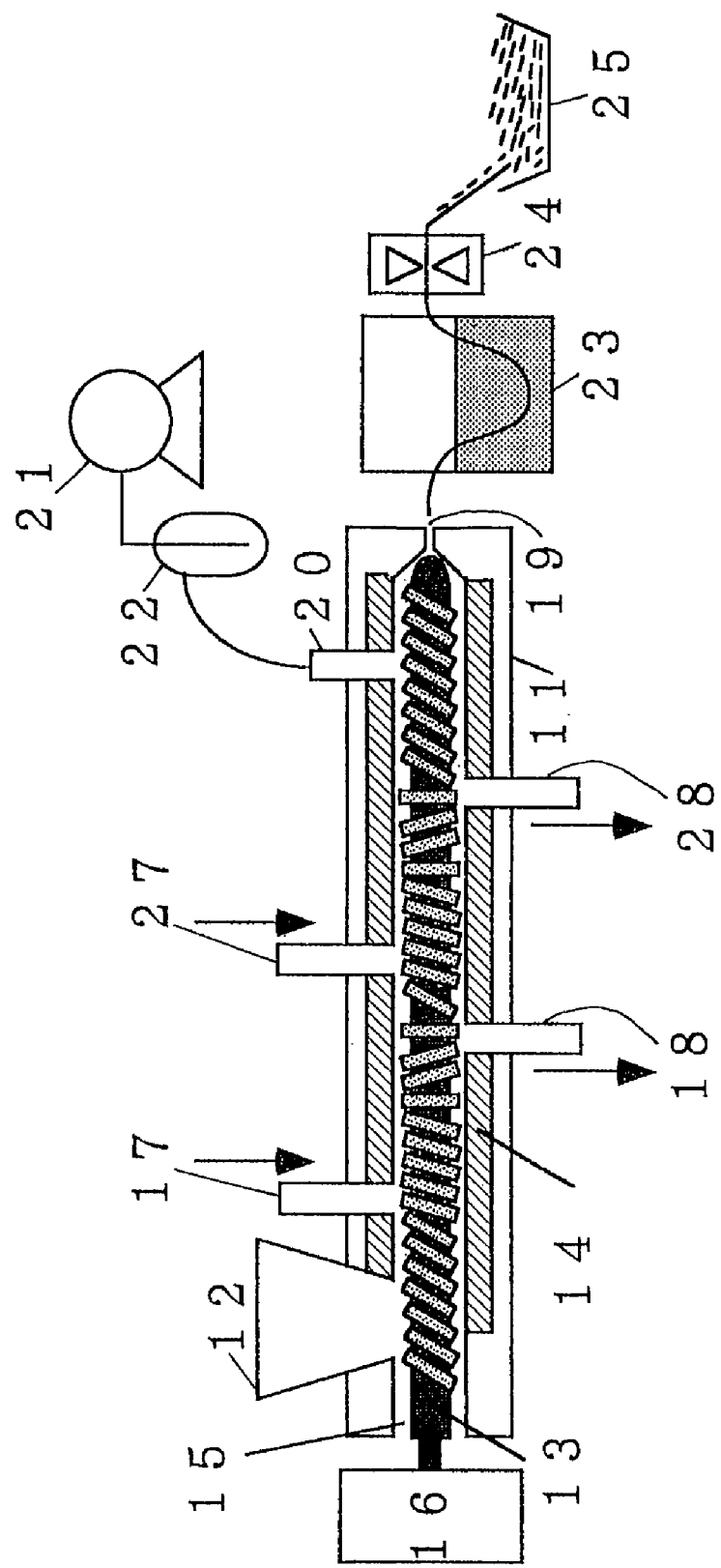
FIG. 6 is a schematic view of an apparatus illustrating Example 4 of the present invention.

In the present example, the same thermoplastic resin composition as used in Example 2 was prepared and the removal treatment of a flame retardant was performed using the apparatus as shown in FIG. 6. The difference between FIGS. 5 and 6 is that two solvent outlets 18 and 28 were provided at locations lower than the kneader.

The heater 14 for the cylinder 15 was first set at 180° C. The resin composition that was roughly ground to 5 mm square was supplied from the hopper 12 and dipropylene glycol (a solubility parameter of 20.5) was added from the first solvent inlet 17, and they were subjected to heating and kneading treatment. At this time, the segment of the screw 13 was adjusted such that the solvent in which the flame retardant component was dissolved was discharged from the first outlet 18. The same operation was performed for the second solvent inlet 27 and the second solvent outlet 28. At this time, both of the first and the second solvent were charged in an amount of 5.0 relative to the amount of charged resin of 1.0. The amounts of recovered solvent were 4.9 and 5.0 for the first and the second, respectively. After that, a vacuum pump 21 was provided to a vent 20 through a solvent trap 22; the resin was discharged from a resin outlet 19; and resin pellets 25 were obtained through a cooling bath 23 and a cutter 24.

The remained amount of the flame retardant in the obtained resin was determined by GPC, and it was found that the flame retardant was removed down to 1.2% relative to 100% of the initial weight. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 1%, which was found to be less than that for Example 3. It was found that 98% of the initial weight of the original solvent could be recycled by solidifying and separating the flame retardant component by distillation.

EXAMPLE 5

In the present example, a thermoplastic resin composition consisting of 15 parts by weight of a bromine-based flame retardant of a tetrabromobisphenol A-based epoxy oligomer-type and 3 parts by weight of antimony trioxide as additive components and high-impact polystyrene (a weight average molecular weight of the resin of 120,000 and a solubility parameter of 17.6 to 18.6) as a resin component was prepared, and the flame retardant component and the flame retardant auxiliary contained in the resin composition was to be separated. The apparatus shown in FIG. 6 was used for the separation treatment.

The heater 14 for the cylinder 15 was first set at 180° C. The resin composition that was roughly ground to 5 mm square was supplied from the hopper 12 and dipropylene glycol (a solubility parameter of 20.5) was added in an amount five times the weight of the charged resin from the first solvent inlet 17, and they were subjected to heating and kneading treatment. At this time, the segment of the screw 13 was adjusted such that the solvent in which the flame retardant components were dissolved was discharged from the first outlet 18. Then, ethylene glycol (a solubility parameter of 29.9) was added in an amount three times the weight of the charged resin from the second solvent inlet 27, and they were subjected to the same heating and kneading treatment before the solvent was discharged from the second outlet 28. The amounts of recovered solvent were 4.9 and 3.0 for the first and the second, respectively. After that, a vacuum pump 21 was provided to a vent 20 through a solvent trap 22; the resin was discharged from a resin outlet 19; and resin pellets 25 were obtained through a cooling bath 23 and a cutter 24.

The remained amount of the flame retardant in the obtained resin was determined by GPC, and it was found that the flame retardant was removed down to 1.8% relative to 100% of the initial weight. Also, by a fluorescent X-ray analysis, it was confirmed that the concentration of antimony in the resin decreased to about 20% of the initial concentration. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 0.8%. It was found that 98% of the initial weight of the used solvents could be recycled by distillation operations for each of the solvents.

EXAMPLE 6

In the present invention, the study was performed using the same thermoplastic resin composition as used in Example 5. The treatment apparatus that was used is also the same.

The heater 14 for the cylinder 15 was first set at 180° C. The resin composition that was roughly ground to 5 mm square was supplied from the hopper 12 and ethylene glycol (a solubility parameter of 29.9) was added in an amount five times the weight of the charged resin from the first solvent inlet 17, and they were subjected to heating and kneading treatment. At this time, the segment of the screw 13 was adjusted such that the solvent in which the flame retardant components were dissolved was discharged from the first outlet 18. Then, ethylene glycol (a solubility parameter of 29.9) was added in an amount three times the weight of the charged resin also from the second solvent inlet 27, and they were subjected to the same heating and kneading treatment before the solvent was discharged from the second outlet 28. The amounts of recovered solvent were 4.9 and 3.0 for the first and the second, respectively. After that, a vacuum pump 21 was provided to a vent 20 through a solvent trap 22; the resin was discharged from a resin outlet 19; and resin pellets 25 were obtained through a cooling bath 23 and a cutter 24.

The remained amount of the flame retardant in the obtained resin was determined by GPC, and it was found that the flame retardant remained by 20% relative to 100% of the initial weight. Also, by a fluorescent X-ray analysis, it was confirmed that the concentration of antimony in the resin decreased to about 50% of the initial concentration. The removal rate was lower than Example 5. It was able to be confirmed that the same solvent was usable for removing both of the additives. However, it can be judged that each of the additives is preferably removed with different solvents as in Example 5 in terms of the removal rate. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 0.8%. It was found that 98% of the initial weight of the used solvent could be recycled by distillation.

EXAMPLE 7

In the present invention, the study was performed using the same thermoplastic resin composition as used in Example 5. The treatment apparatuses that were used were the one shown in FIG. 3 for treating the bromine-based flame retardant and the one shown in FIG. 4 for treating the antimony-based flame retardant auxiliary.

The resin composition was first roughly ground to blocks of about 5 mm square and was fed to the apparatus of FIG. 3 together with dipropylene glycol 7 (a solubility parameter of 20.5), followed by agitation at 180° C. for two hours. The liquid in which the flame retardant was dissolved was then recovered from the outlet. After the apparatus was sufficiently stood to cool, the resin component 6 was recovered from the inlet.

Then, the treatment was continued using the apparatus shown in FIG. 4. Specifically, the heater 14 for the cylinder 15 was set at 180° C. The recovered thermoplastic resin composition from which at least part of the bromine-based flame retardant was removed was supplied from the hopper 12 and ethylene glycol (a solubility parameter of 29.9) was added in an amount three times the weight of the charged resin from the solvent inlet 17, and they were subjected to heating and kneading treatment. At this time, the segment of the screw 13 was adjusted such that the solvent in which the flame retardant components were dissolved was to be discharged from the outlet 18. The amount of the solvent recovered was 3.0. After that, a vacuum pump 21 was provided to a vent 20 through a solvent trap 22; the resin was discharged from a resin outlet 19; and resin pellets 25 were obtained through a cooling bath 23 and a cutter 24.

The remained amount of the flame retardant in the obtained resin was determined by GPC, and it was found that the flame retardant was removed down to 5% relative to 100% of the initial weight. Also, by a fluorescent X-ray analysis, it was confirmed that the concentration of antimony in the resin decreased to about 10% of the initial concentration. In addition, the weight average molecular weights were determined for the polystyrenes before and after the treatment, and no significant difference was found in the change of the molecular weight. Therefore, the recovered polystyrene was found to be reusable as a raw material. The residual solvent in the resin was about 0.8%. It was found that 98% of the initial weight of the used solvents could be recycled by distillation operations for each of the solvents.

EXAMPLE 8

In the present example, a thermoplastic resin composition consisting of 0.1 part by weight of a phenol-based antioxidant and 0.3 part by weight of a sulfur-based antioxidant as additive components and polypropylene (a weight average molecular weight of the resin in terms of polystyrene of 100,000 and a solubility parameter of 18.8) as a resin component was prepared, and the antioxidant components contained in the resin composition were to be separated. The apparatus that was used is the same as shown in FIG. 3.

The resin composition was first roughly ground to blocks of about 5 mm square and was fed to the apparatus of FIG. 3 together with 2-methyl-1-pentanol (a solubility parameter of 21.3), followed by agitation at about 125° C. for two hours. The liquid in which the additives were dissolved was then recovered from the outlet. After the apparatus was sufficiently stood to cool, the resin component was recovered from the inlet.

The remained amount of the additives in the obtained resin was determined by GPC by comparing with initial peaks, and it was found that the additives were removed down to 3% relative to 100% of the initial weight. In addition, the weight average molecular weights were determined for the resins before and after the treatment, and no significant difference was found in the change of the molecular weight. Therefore, the recovered resin was found to be reusable as a raw material. The residual solvent in the resin was about 3%.

EXAMPLE 9

In the present invention, the study was performed using the same resin composition as used in Example 6.

The resin composition was first roughly ground to blocks of about 5 mm square and was fed to the apparatus of FIG. 3 together with ethyl lactate (a solubility parameter of 20.5), followed by agitation at about 170° C. for two hours. The liquid in which the additives were dissolved was then recovered from the outlet. After the apparatus was sufficiently stood to cool, the resin component was recovered from the inlet.

The remained amount of the additives in the obtained resin was determined by GPC by comparing with initial peaks, and it was found that the additives were removed down to 2% relative to 100% of the initial weight. In addition, the weight average molecular weights were determined for the resins before and after the treatment, and no significant difference was found in the change of the molecular weight. Therefore, the recovered resin was found to be reusable as a raw material. The residual solvent in the resin was about 5%.

As described above, the use of the treatment method and the treatment apparatus according to the present invention allows separation and removal of only the additives that become unnecessary from the thermoplastic resin composition used in waste home electric appliances which will be discarded in great quantities in future and will become a problem. In addition, the recycle of the resin achieves reduction of the amount of wastes, and also the solvent used for the regeneration can be reused. Thus, these will be of some help to the solution of environmental issues that is now needed.

The invention claimed is:

1. A method of treating a thermoplastic resin composition, the thermoplastic resin composition comprising a thermoplastic resin, a bromine-including flame retardant and an antimony-including flame retardant auxiliary, the method comprising:

a step (a) of heating and agitating said thermoplastic resin composition together with a first solvent at a temperature ranging from a glass transition temperature of said thermoplastic resin to a boiling point of said first solvent inclusive; and separating and recovering said first solvent in a liquid state in which at least part of said bromine-including flame retardant is dissolved from said thermoplastic resin composition, so that at least part of said bromine-including flame retardant is separated and removed from said thermoplastic resin composition, and a step (b) of heating and agitating said thermoplastic resin composition together with a second solvent containing at least one selected from ethylene glycol and propylene glycol at a temperature ranging from a glass transition temperature of said thermoplastic resin to a boiling point of said second solvent inclusive; and separating and recovering said second solvent in a liquid state in which at least part of said antimony-including flame retardant auxiliary is dissolved from said thermoplastic resin composition, so that at least part of said antimony-including flame retardant auxiliary is separated and removed from said thermoplastic resin composition, wherein:

said step (b) is performed after said step (a) or said step (a) is performed after said step (b);

said thermoplastic resin comprises any one of polystyrene, poly-α-methyl styrene, poly-(styrene-butadiene), poly-(styrene-acrylonitrile), poly-(styrene-butadiene-acrylonitrile), poly-(styrene-maleic anhydride), and impact-resistant high-impact polystyrene; and said first solvent is selected from the group consisting of ethylene glycol, diethylene glycol, propylene glycol, dipropylene glycol, diethylene glycol methyl ether, diethylene glycol ethyl ether, diethylene glycol propyl ether, diethylene glycol butyl ether, propylene glycol methyl ether, propylene glycol ethyl ether, propylene glycol propyl ether, dipropylene glycol methyl ether, dipropylene glycol ethyl ether, dipropylene glycol propyl ether, dipropylene glycol butyl ether, triethylene glycol methyl ether, triethylene glycol ethyl ether, triethylene glycol propyl ether, triethylene glycol butyl ether, tripropylene glycol methyl ether, tripropylene glycol ethyl ether, tripropylene glycol propyl ether, tripropylene glycol butyl ether, ethyl lactate, butyl lactate, and mixtures thereof.

2. The method of treating a thermoplastic resin composition according to claim 1, wherein step (b) is performed after said step (a).

3. The method of treating a thermoplastic resin composition according to claim 1, wherein the bromine-including flame retardant is decabromodiphenyl ether, octabromodiphenyl ether, tetrabromodiphenyl ether, tetrabromobisphenol A, hexabromocyclododecane, bis(tribromophenoxy) ethane, tribromophenol, ethylene bis-tetrabromophthalimide, a tetrabromobisphenol A polycarbonate oligomer, a brominated polystyrene, a tetrabromobisphenol A epoxy oligomer, or a mixture thereof.

4. The method of treating a thermoplastic resin composition according to claim 3, wherein said antimony-including flame retardant is antimony trioxide.

5. The method of treating a thermoplastic resin composition according to claim 4, wherein said thermoplastic resin is impact-resistant high-impact polystyrene.

6. The method of treating a thermoplastic resin composition according to claim 5, wherein said first solvent is dipropylene glycol.

7. The method of treating a thermoplastic resin composition according to claim 6, wherein said second solvent is ethylene glycol.

8. The method of treating a thermoplastic resin composition according to claim 7,
wherein step (b) is performed after said step (a).

9. The method of treating a thermoplastic resin composition according to claim 1,
wherein said thermoplastic resin is impact-resistant high-impact polystyrene.

10. The method of treating a thermoplastic resin composition according to claim 9,
wherein the antimony-including flame retardant is antimony trioxide.

11. The method of treating a thermoplastic resin composition according to claim 10,
wherein said first solvent is dipropylene glycol, said second solvent is ethylene glycol, and said step (b) is performed after said step (a).

12. The method of treating a thermoplastic resin composition according to claim 2,
wherein the bromine-including flame retardant is decabromodiphenyl ether, octabromodiphenyl ether, tetrabromodiphenyl ether, tetrabromobisphenol A, hexabromocyclododecane, bis(tribromophenoxy) ethane, tribromophenol, ethylene bis-tetrabromophthalimide, a tetrabromobisphenol A polycarbonate oligomer, a brominated polystyrene, a tetrabromobisphenol A epoxy oligomer, or a mixture thereof.

13. The method of treating a thermoplastic resin composition according to claim 12,
wherein said antimony-including flame retardant is antimony trioxide.

* * * * *